US012752494B2

(12) United States Patent
Spurgeon

(10) Patent No.: US 12,752,494 B2
(45) Date of Patent: Oct. 6, 2026

(54) ENERGY WELDING DEVICE AND METHOD

(71) Applicant: Alex Spurgeon, Grove City, OH (US)

(72) Inventor: Alex Spurgeon, Grove City, OH (US)

( * ) Notice: Subject to any disclaimer, the term of this patent is extended or adjusted under 35 U.S.C. 154(b) by 111 days.

(21) Appl. No.: 18/437,571

(22) Filed: Feb. 9, 2024

(65) Prior Publication Data

US 2024/0269938 A1 Aug. 15, 2024

Related U.S. Application Data

(60) Provisional application No. 63/484,253, filed on Feb. 10, 2023.

(51) Int. Cl.
*B29C 65/00* (2006.01)
*B29C 65/30* (2006.01)
*B29C 65/60* (2006.01)
*H02J 3/00* (2026.01)

(52) U.S. Cl.
CPC .............. *B29C 66/95* (2013.01); *B29C 65/30* (2013.01); *B29C 65/606* (2013.01); *H02J 3/00* (2013.01)

(58) Field of Classification Search
CPC ....... B29C 66/95; B29C 65/30; B29C 65/606; H02J 3/00
See application file for complete search history.

(56) References Cited

U.S. PATENT DOCUMENTS 5,366,580 A * 11/1994 Czach ............... B29C 66/91231 331/34
11,673,348 B1 * 6/2023 Viator .................... B65D 88/54 156/64
2018/0214966 A1 * 8/2018 Peters .................... B23K 9/173

* cited by examiner

*Primary Examiner* — George R Koch
(74) *Attorney, Agent, or Firm* — Steven A. Hill

(57) ABSTRACT

The present disclosure relates to a novel system and methods enabling welding of thermoplastic parts by computation and measured delivery of heat energy required as opposed to computation of power over time without consideration for heat build-up in the delivery system. One application is in plastic staking.

4 Claims, 3 Drawing Sheets

ENERGY WELDING DEVICE AND METHOD

CROSS REFERENCE TO RELATED APPLICATIONS

This application claims the benefit of U.S. Provisional Application No. 63/484,253, filed on Feb. 10, 2023.

STATEMENT REGARDING FEDERALLY SPONSORED RESEARCH AND DEVELOPMENT

No federally sponsored research and development is included in this application.

BACKGROUND OF THE INVENTION

The present disclosure relates to a novel device and method enabling welding of thermoplastic parts by computation and measured delivery of heat energy required as opposed to computation of power over time delivered without consideration for heat already built-up in the delivery system or parts. One application is in plastic staking.

Broadly, welding is the practice of joining materials by causing the separate components, or parts, to fuse together as a result of heat. The materials under consideration in this disclosure are thermoplastics. As used in this disclosure, "welding" includes bonding where another material is used between the parts to be joined.

Consider application of welding by energy in plastic heat staking. The purpose of plastic heat staking is to bond, essentially by welding, one part to another part with a "boss" or other joining feature that is heated and formed into a dome shape that creates a mechanical bond. The unformed boss starts out as a post of any geometric shape upstanding from the sheet of another surface, such as a part, from which it is upstanding. In the present case, the boss is placed in a hole or other mating feature on a second part to which the boss-carrying part is to be attached or mated. This mating part can be made from a wide range of materials. Using heat from a probe, the boss is formed into a shape that is larger than the size of the opening through which it protrudes. The flattening or enlarging of the boss generates a mechanical bond whereby the two parts are inseparable unless excessive force is placed on the deformed (enlarged) boss.

However, in place of a separate boss, additional material can be manufactured onto the parts, to form the desired bond.

PRIOR ART

At least five heat-producing energy methods are currently in use for welding thermoplastics, including ultrasonic, radio frequency ("RF"), laser, vibration, and gas. Each such method generates heat sufficient to fuse the thermoplastic, and then withdraws to allow cooling and solidification at the joint. The ultrasonic method uses high-frequency acoustic vibrations directed at the interface, or joint, where the materials are to be fused. Other external forces supplement the ultrasonic process to create a molecular bond. The radio frequency method uses electromagnetic waves, typically in the microwave spectrum, directed at the joint to generate the needed heat. Radio frequency is the currently preferred method, in part because the time to weld is on the order of 2-5 seconds. Using electromagnetic waves in the laser spectrum, the laser method passes a beam across the joint, with the parts pressed together, to form the bond. This takes on the order of 3-5 seconds. Vibration welding requires parts to be rubbed together at specific amplitude and frequency to generate the heat to form the bond. This typically requires 1-5 seconds. Gas welding uses electrically heated gas directed the joint to cause fusion.

These methods may use welding by time in an open-loop process. The energy, as sound, RF, laser, vibration, or hot gas, would be applied for a predetermined amount of time, with no feedback indication whether the weld was successful. Or, these methods may operate in a closed-loop, with feedback as to temperature of the heat source and of the materials at the joint, and other information that would indicate whether the weld was successful. Whether closed or open, the current methods focus on temperature and time.

Here is the problem: from cycle to cycle, welds may become inconsistent and problematic if heat build up in the system prevents sufficient energy from being applied to the weld. A solution proposed here is to focus on ensuring that sufficient energy is delivered to the weld. Time per weld may vary, but weld quality is more consistent.

Under certain controlled conditions, the amount of energy needed to weld particular materials, may be computed in advance. As such, no feedback sensors are needed in an open loop process. The process would require measurement of energy delivered to the weld. Under other controlled conditions, sensors may be used in a closed-loop process to fine tune energy delivery.

SUMMARY OF THE INVENTION

This disclosure presents a device and method of welding appropriate thermoplastics by applying heat by contact via a tip touching the joint, in either an open loop or closed loop, by focusing on the energy drawn by the tip. Energy, of course, is the integration of power applied over time. Electrical power, which is converted to heat energy, is generally the product of voltage and current; both of which are easily measured and controlled. In an open-loop embodiment, the energy needed would be known and delivered at the tip and applied accordingly. In a closed-loop embodiment, as may be required for some thermoplastic materials, the energy required could vary in order to fuse the thermoplastic parts. In both embodiments, the controlling measurement is energy delivered. Given that the focus here is on energy delivery, the time to accomplish a proper weld may vary from cycle to cycle. However, the quality of each weld is more likely to be consistent from cycle to cycle.

One benefit of this way of delivering energy is that it can account for slight temperature rise in transformers and conductors (the "equipment"). There will be temperature variability over multiple cycles that will not be consistent if only heating based on a timer-welding by energy will account for this and ensure that all cycles are consistent from part to part.

For example, if the system starts up and transformers and conductors are at 72 degrees Fahrenheit, it will run more efficiently than if the transformer and conductors are at 95 degrees Fahrenheit. There will be a temperature rise in these items over time unless cooling methods are used. If only welding by time, the tip will get hotter when the transformer and conductors are at 72 degrees Fahrenheit because there is less resistance than when the equipment is at 95 degrees Fahrenheit, and more energy is delivered to the tip as opposed to radiated as heat. Because of this issue, the system will run well for the first 20 cycles (or so), but as the equipment heats up, it will start to produce incomplete welds. Weld generally would be inconsistent from cycle to cycle. To improve the welds, we need more energy delivered to the weld. Increasing heat time will help, but will also build more heat into the equipment. This can create a thermal runaway situation where the system requires more and more time to complete a proper weld.

By using welding by energy we can always account for the temperature built up in the equipment and provide consistent welds. Research has shown that, with proper cooling, the equipment will level out around 95 degrees Fahrenheit.

DETAILED DESCRIPTION OF THE INVENTION

In the following detailed description, reference is made to the accompanying drawings, which form a part hereof, and in which are shown various specific embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the present disclosure. The following detailed description, therefore, is not to be taken in a limiting sense. The scope of the present disclosure is defined only by the appended claims, along with the full scope of equivalents to which such claims are entitled.

The following reference numbers are used in the figures and accompanying descriptions:

| | |
|---|---|
| 100 | System |
| 102 | Controller |
| 104 | Program |
| 106 | Power source |
| 108 | Transformer |
| 110 | Relay |
| 112 | Voltage sensor |
| 114 | Current sensor |
| 118 | Electrical energy |
| 119 | Heat energy |
| 120 | Lead |
| 122 | Tip |
| 130 | Part |
| 132 | Bond material |
| 134 | Part |
| 140 | Heat applicator |
| 142 | Energy sensor |
| 200 | Open loop method |
| 202 | Placement step |
| 204 | Alignment step |
| 206 | Contact step |
| 208 | Energize step |
| 210 | Retract step |
| 212 | Remove step |
| 200 | Closed loop method |
| 308 | Measure step |
| 309 | Energize step |
| 310 | Decision step |
| 502 | Instructions |
| 504 | Waveform Control |
| 506 | Voltage Information |
| 508 | Current Information |
| 510 | Relay Control |
| 512 | Energy Information |

BRIEF DESCRIPTION OF DRAWINGS

For a fuller understanding of the nature and advantages of the present method and process, reference should be had to the following detailed description taken in connection with the accompanying drawings, in which.

The drawings are described in greater detail below.

DETAILED DESCRIPTION OF THE DRAWINGS

Consider a first part and a second part, both being thermoplastics, to be joined. For discussion, the first part has additional thermal plastic material manufactured at the place where the parts are to be joined. Alternatively, the second part, or both parts could have such additional, manufactured material. A fixture is used to hold the first and second parts in place as heat is applied.

It is well known that, in an electrical circuit, that power is generally voltage times current. If the voltage is sinusoidal, then average power is the product of the RMS values for voltage and current. Energy, then, is the mathematical integration of power over time. In a computer-controlled system with appropriate sensors, voltage and current can be regulated over time to deliver a desired amount of energy to a load. Further, as contemplated here, electrical energy is converted to heat energy to accomplish the desired welding task.

Figure 1:
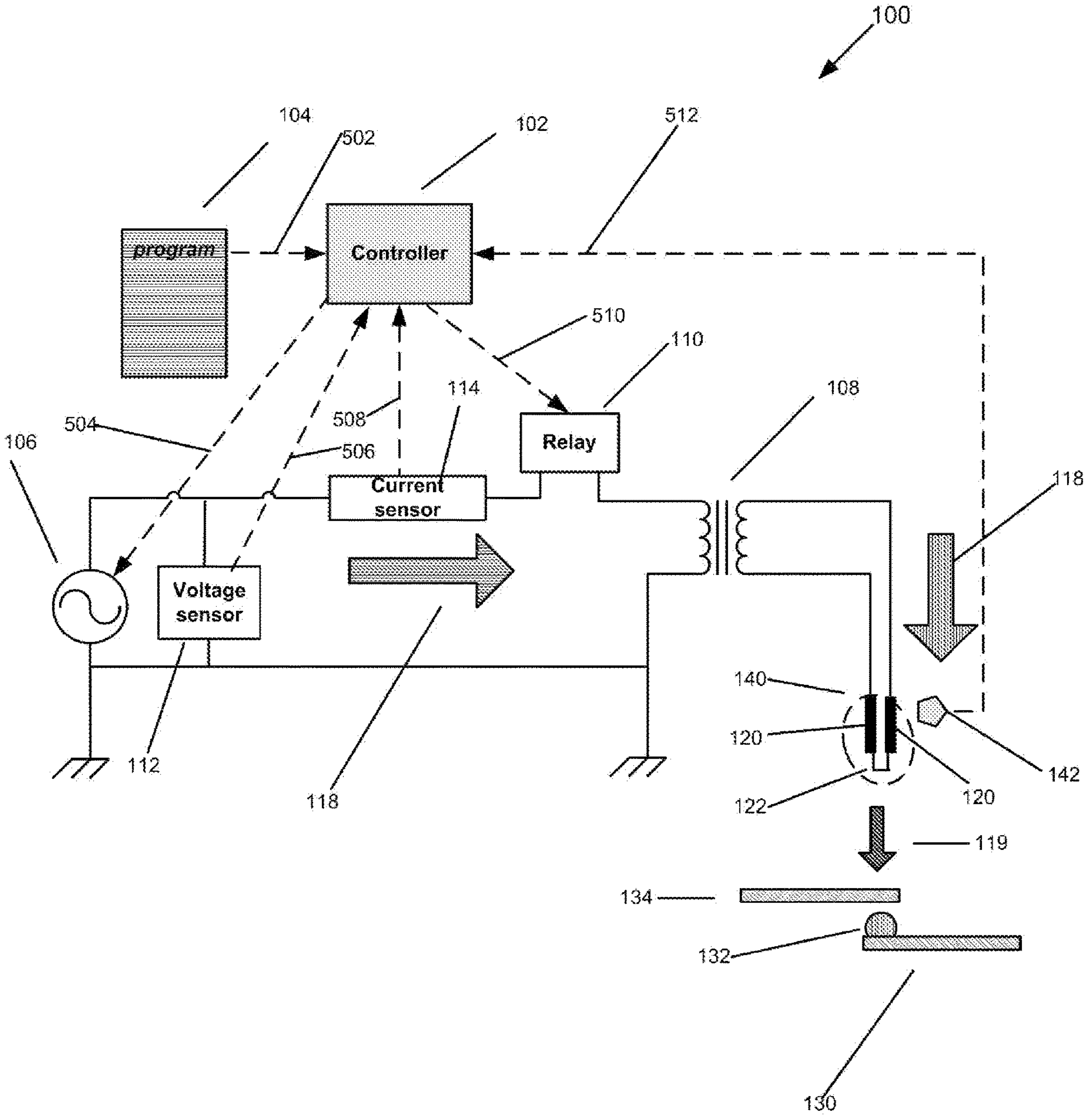
FIG. 1 depicts the system.

FIG. 1 shows the one embodiment of system 100. comprising a welding circuit. Electrical energy 118 is produced in a power source 106. In this embodiment, the power source 106 would typically be 110 volt or 220 volt (VAC) providing alternating current. Voltage sensor 112 and current sensor 114 are arranged to provide voltage and current information used to compute energy to be delivered. Although FIG. 1 shows current sensor 114 in series, other topologies, such as measuring voltage across a shunt resistor, may be used to provide current information 108. A relay 110, typically a solid state or electromechanical relay, controls current delivered to a transformer 108, primary side. When relay 110 is "on," electrical energy 118 is induced through transformer 108 from primary side to its secondary side. Transformer 108 is typically step-down, reducing voltage at its secondary side to 5 VAC. That electrical energy 118 is then delivered through leads 120 to a tip 122. The tip 122 creates a short circuit, which transforms electrical energy 118 to heat energy 119. Controller 102, as instructed by its program 104 and corresponding instructions 502, receives voltage information 506 from voltage sensor 112 and current information 508 from current sensor 144, and computes in real time the flow of electrical energy 118. Controller 102, via relay control 510, directs relay 110 to be "on" or "off", and thus manages the flow of electrical energy through transformer 108. After delivery of the required heat energy 119, relay 510 would be set to "off." Controller 102 may also manage the electrical output of power source 106 via waveform control 504. As such, power source 106 waveform may be manipulated increase or decrease effective electrical energy 118. Deep leads 120 and tip 122 comprise a heat applicator 140 which is used to deliver heat energy 119 to parts 130 and 134 to be joined. Bond material 132 is provided on thermoplastic parts 130 or part 134 or both, which when provided with heat energy sufficiently will cause parts 130 and 134 to be joined.

In other embodiments, waveform control 504 from controller 102 may be directed on the secondary side of transformer 108, as opposed to the primary side as shown in FIG. 1.

In other embodiments, voltage of power source 106 may be fixed. In such case, voltage sensor 112 may not be required, and other means may be used to control voltage and current waveforms to deliver a desired amount of electric energy 118.

In an alternative embodiment, energy sensor 142 provides energy information 512 to controller 102 on the amount of energy in the heat applicator 140, so that controller 102 can decide how much energy 119, if any, must still be delivered in order to join parts 130 and 134. Energy sensor 142 may provide temperature and heat information which the controller 102 would use to compute power. Energy 119, of course, is delivered as heat energy.

Figure 2:
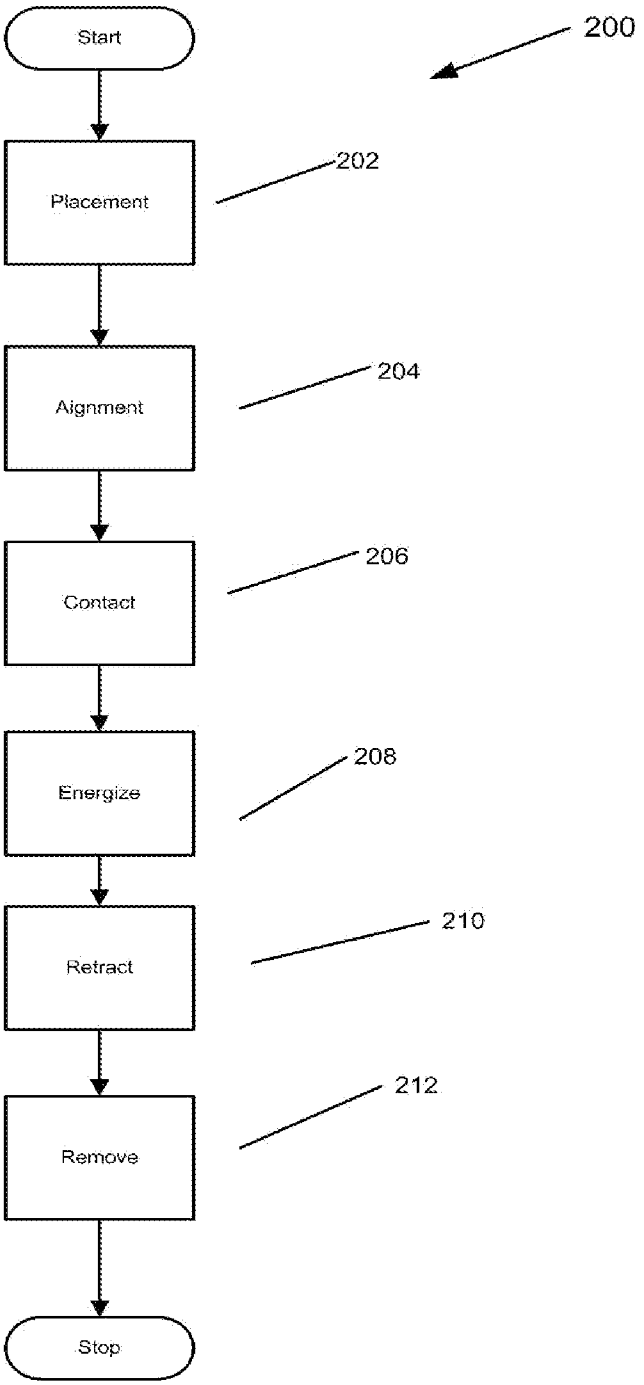
FIG. 2 shows an open loop method.

FIG. 2 shows an open loop method 200, as directed by controller 102 and its program 104. In placement step 202, the first part 130, with the additional bond material 132, is placed into the fixture and held securely. In alignment step 204, the second part 134 is aligned with the first part 130 as desired. In contact step 206, the heat applicator 140 is applied appropriately to parts 130 and 134 at the place where they are joined relative to bond material 132. A measured amount of heat energy 119 (computed from electrical energy 118) is then applied in the energize step 208, based on the particular properties of the parts 130 and 134, and bond material 132. After the appropriate amount of energy 119 is delivered, the heat applicator 140 is withdrawn in the retract step 210, and the joined parts are taken as one from the fixture in the remove step 212.

Figure 3:
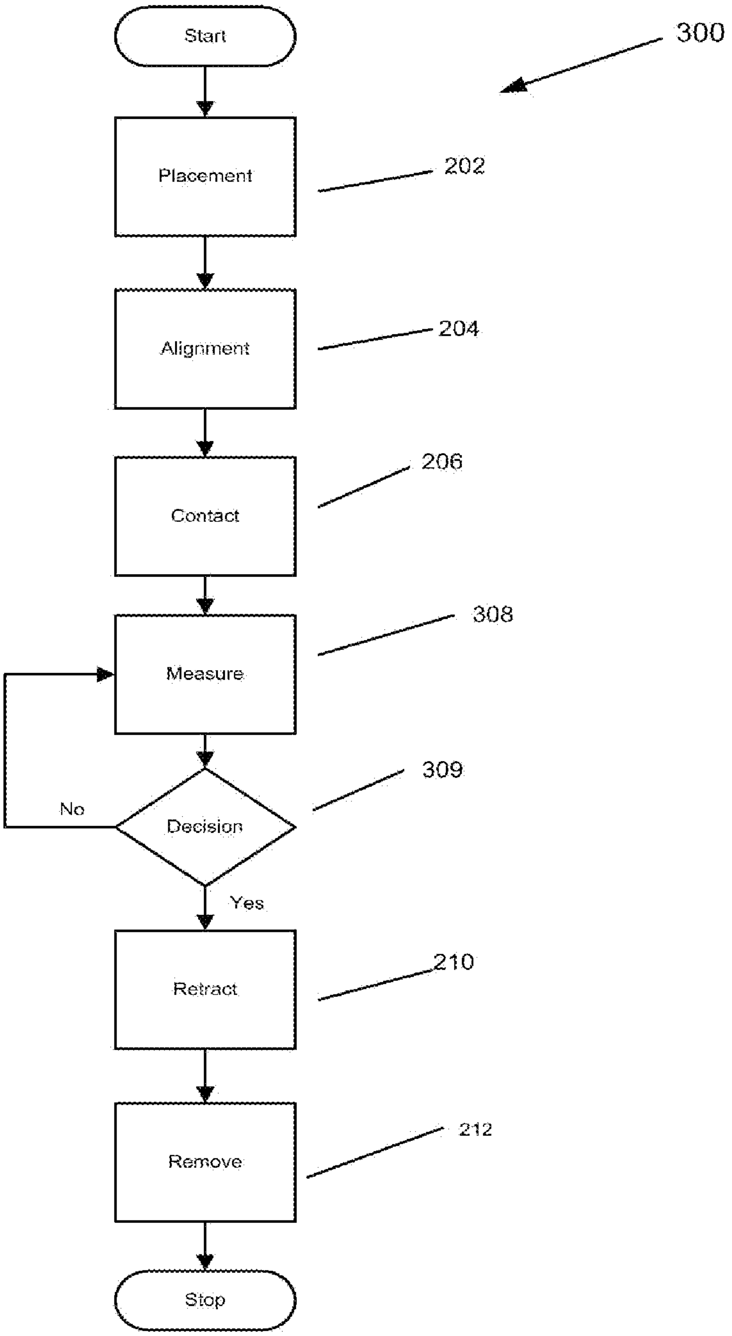
FIG. 3 shows a closed loop method.

FIG. 3 shows closed loop method 300, as directed by controller 102 and its program 104. As in FIG. 2, in placement step 202, the first part 130, with bond material 132, is placed into the fixture and held securely. In the alignment step 204, the second part 134 is aligned with the first part 130 as desired. In the contact step 206, the heat applicator 140 is applied appropriately to the parts 130 and 134 and bond material 132 at the place where they are joined. Here, though, in measure step 308, energy in the heat applicator 140 is measured via energy sensor 142 to determine incremental amount of heat energy needed to accomplish the weld based on the particular properties of the parts 130 and 134, and the bond material 132. From that, incremental amounts of electrical energy 118 needed to produce heat energy 119 are determined. The incremental measured amounts of heat energy are then applied a loop comprising in the energize step 308 and the decision step 309, until all required energy has been delivered. In an alternative embodiment, heat energy already in heat applicator 140 will be considered in the determination of how much additional energy is needed in step 308. After the appropriate amount of energy is delivered, the heat applicator 140 is withdrawn in the retract 210 step, and the joined parts are taken as one from the fixture in the remove 212 step.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. Also, any and all citations referred to herein are expressly incorporated herein by reference.

I claim:

1. A computer-controlled welding system for precision energy management in applying heat to thermoplastic materials by direct-contact resistive heating, comprising:

a power source configured to supply electrical energy;

a voltage sensor connected to the power source to measure voltage supplied to a welding circuit;

a current sensor connected in the welding circuit to measure current flowing through the welding circuit;

a relay operatively connected to the power source to control supply of electrical energy;

a transformer connected to the relay and configured to deliver a low-voltage output to the welding circuit for resistive heating without generating an electrical arc;

a heat applicator comprising leads connected to the welding circuit and a tip configured to contact thermoplastic material and generate heat by resistive conduction;

a controller configured to receive inputs from the voltage sensor and the current sensor, and to control the relay based on the inputs; and a non-transitory computer-readable medium storing instructions that, when executed by the controller, perform operations comprising:

i) calculating an electrical energy output value for application to the thermoplastic material based on the measured voltage and current;

ii) adjusting the supply of electrical energy through the relay based on the calculated electrical energy output value; and iii) monitoring a welding process to adjust the supply of electrical energy dynamically for precision welding of the thermoplastic materials, wherein the controller regulates application of electrical energy based on the measured voltage and current independent of temperature calculation or resistance-derived temperature estimation.

2. The device of claim 1, further comprising a total power consumption sensor operatively connected to the controller, configured to measure total power consumption of the welding device, wherein the stored instructions further include operations for adjusting the welding process based on the measured total power consumption.

3. A computer-implemented method for precision welding of thermoplastic materials by resistive contact heating, using:

a voltage sensor configured to measure voltage supplied to a welding circuit;

a current sensor configured to measure current flowing through the welding circuit;

a relay configured to control supply of electrical energy to the welding circuit;

a transformer configured to provide a low-voltage output to the welding circuit for resistive heating without generation of an electrical arc;

a heat applicator comprising leads and a tip configured to contact thermoplastic materials; and a controller configured to receive inputs from the voltage sensor and the current sensor and to control the relay;

the method comprising:

placing thermoplastic materials to be welded in a predetermined position;

aligning the heat applicator with the thermoplastic materials;

making contact between the tip of the heat applicator and the thermoplastic materials;

energizing the welding circuit to apply a determined amount of electrical energy based on measured voltage and current to the thermoplastic materials; and adjusting supply of electrical energy during welding to maintain a desired applied-energy profile, wherein the controller regulates application of electrical energy based on the measured voltage and current independent of temperature calculation or resistance-derived temperature estimation.

4. The method of claim 3, further comprising determining an effectiveness of a weld based on inputs from the voltage sensor and the current sensor, and adjusting the supply of electrical energy based on the determination.

* * * * *